United States Patent Office 3,281,686
Patented Oct. 25, 1966

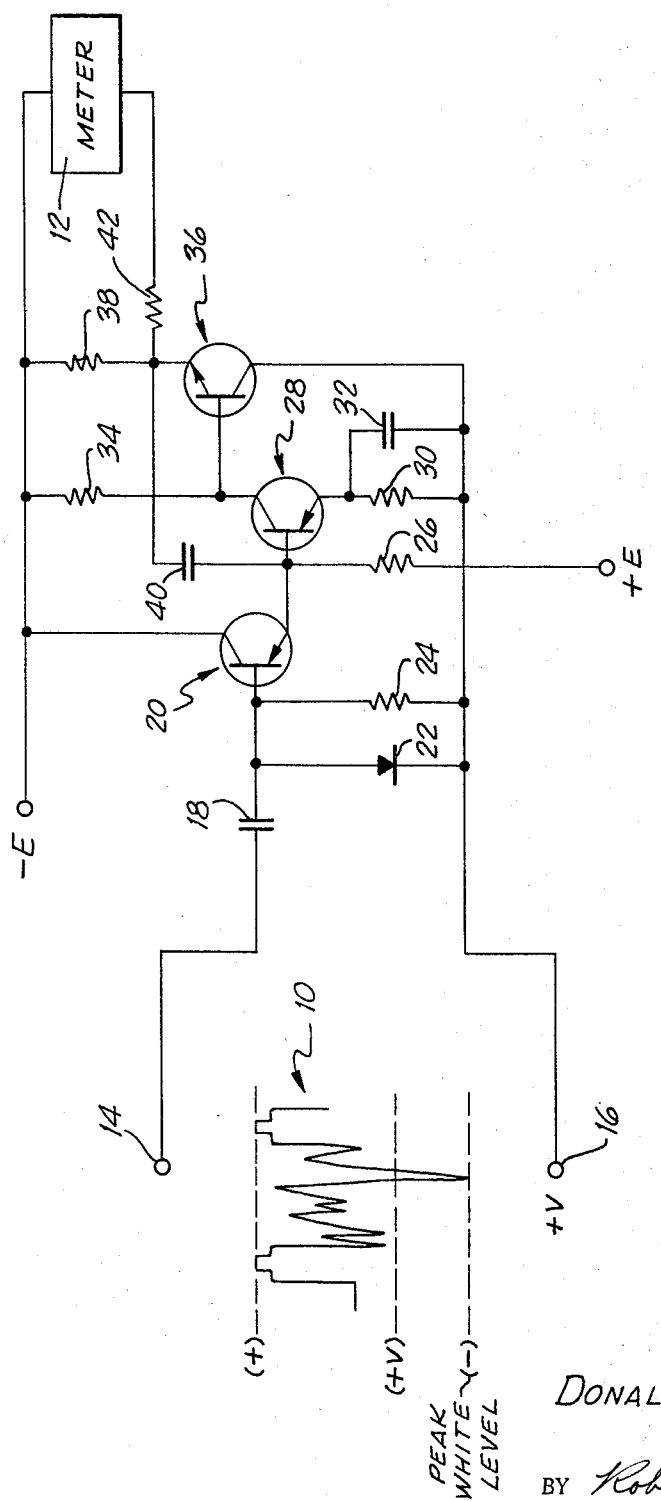

3,281,686
CIRCUIT FOR DETECTING AND INDICATING PEAK VALUES OF RANDOMLY VARYING SIGNALS WITH CAPACITOR STORAGE MEANS
Donald J. Cochran, Pacifica, Calif., assignor to Ampex Corporation, Redwood City, Calif., a corporation of California
Filed June 26, 1963, Ser. No. 290,826
3 Claims. (Cl. 324—103)

This invention relates generally to detection apparatus and particularly to means for detecting and indicating peak values of randomly varying signals.

In several diverse areas, it is necessary to determine the peak values of a randomly varying electrical signal. For example, in recording video information, it is essential to monitor the video input signal in order to establish appropriate recording levels. The conventional procedure utilized to detect and indicate the peak values of a video input signal requires the utilization of an oscilloscope external to the recording equipment.

It is an object of the present invention to provide apparatus for detecting and indicating the peak level of a signal which is simpler and less expensive than prior known apparatus.

Briefly, the invention is directed to means for sensing the peak level of a randomly varying signal such that it can be displayed by a conventional meter, such as a decibel meter. Essentially, the technique employed comprises continually monitoring the signal and effectively expanding the time duration of the signal peaks so as to permit the meter to hold an indication of the peak for a sufficient time to allow the meter to be read.

In a preferred embodiment of the invention, a circuit arrangement is provided including a capacitor adapted to be very rapidly charged to a level determined by the peak signal level, and slowly discharged so as to permit the meter, connected to the capacitor, to indicate the peak level. The circuit arrangement includes first and second series circuit branches, each branch including the capacitor. When the input signal is of a first polarity, the capacitor is charged through the first circuit branch; and when the input signal is of a second polarity, the capacitor is discharged through the second circuit branch. Inasmuch as the time constant of the first circuit branch is considerably shorter than the time constant of the second circuit branch, the capacitor can be very rapidly charged to a level determined by the peak level of the input signal; and as a result of the relatively long time constant of the second discharging circuit branch, the charged level is held for a sufficient time to permit the meter connected to the capacitor to be read.

The invention will be described in greater detail with reference to the accompanying drawing, which illustrates a preferred circuit arrangement for expanding the time duration of signal peaks so as to permit the peak levels to be indicated by a meter.

A randomly varying signal 10 is illustrated in the drawing which, for example, represents a video input signal. Let it be assumed that it is desired to monitor and detect the peak-white level (negative) of the video signal so that an indication of the peak level can be displayed by a conventional meter 12, such as a decibel meter.

Inasmuch as the input signal 10 cannot be directly applied to the meter 12 because the time durations of the input signal peaks are too short to permit the meter to be read, circuit means are provided for responding to the peak levels of the input signal by extending the time duration thereof to permit the meter to maintain a peak level indication for a sufficient period.

The circuit means includes a pair of input terminals 14 and 16 across which the input signal 10 is applied. Input terminal 16 is clamped to a first source of positive reference potential +V. Input terminal 14 is connected through a coupling capacitor 18 to the base of a first transistor 20 which is illustrated as being of the PNP type. A diode 22 is provided having its anode connected to the base of transistor 20 and its cathode connected to the input terminal 16. A resistor 24 is connected in parallel with the diode 22.

The transistor 20 is connected in an emitter-follower arrangement, with the emitter thereof connected through a resistor 26 to a second source of positive potential +E. The collector of transistor 20 is connected to a source of negative potential —E.

The emitter of transistor 20 is connected to the base of a transistor 28 which is of the PNP type. The transistor 28 comprises an inverter amplifier having its emitter connected through a parallel circuit including a resistor 30 and capacitor 32 to input terminal 16. The collector of transistor 28 is connected through a resistor 34 to the source of negative potential —E.

The collector of transistor 28 is connected to the base of a transistor 36 which is of the NPN type. Transistor 36 is connected in an emiter-follower arrangement, with the emitter thereof being connected through a resistor 38 to the source of negative potential —E and the collector thereof being connected to input terminal 16.

A capacitor 40 is connected between the emitter of transistor 20 and the emitter of transistor 36. The meter 12 is connected between the source of negative potential —E and a resistor 42 to the emitter of transistor 36.

Exemplary values for the above recited elements are as follows:

| | | |
|---|---|---|
| C18 | microfarad | .1 |
| C32 | do | .1 |
| C40 | do | 5 |
| R24 | ohms | 10K |
| R26 | do | 22K |
| R30 | do | 220 |
| R34 | do | 2.2K |
| R38 | do | 2.2K |
| R42 | do | 68K |
| V | volts | 6 |
| E | do | 12 |
| Diode 22 | | FD 1004 |
| TR20, 28 | | 2N 404 |
| TR36 | | 2N 444 |

Although exemplary quantitative values for the above elements have been set forth, it is pointed out that these values have been provided only to facilitate an understanding of the operation of the invention and it should be readily understood that significant changes in these values can be made without departing from the scope of the invention.

Prior to considering the operation of the invention, it is pointed out that first and second series circuit branches exist which include capacitor 40. More particularly, a first series circuit branch extends from the input terminal 16, through the collector-emitter path of transistor 36, the capacitor 40, and the emitter-collector path of transistor 20 to the source of negative reference potential —E. The second series circuit branch extends from the source of positive reference potential +E through resistor 26, the capacitor 40, and the resistor 38 to the source of negative reference potential —E.

When the input signal 10 is positive with respect to +E, a positive voltage level will be coupled through capacitor 18 to the base of transistor 20. As a consequence, little or no current will flow in the emitter-collector path of transistor 20 and the potential at the emitter of transistor 20 will reside close to +E. Consequently, little or no current will flow in the emitter-collector path of transistor 28 and the potential on the collector of transistor 28 will reside close to —E. Consequently, the potential on the emitter of transistor 36 will reside approximately at —E.

When the input signal 10 becomes negative, current flow is initiated in the emitter-collector path of transistor 20 from the source of positive reference potential +E through the resistor 26 to the source of negative reference potential —E. The magnitude of the current conducted in the emitter-collector path of transistor 20 will be determined by the magnitude of the peak negative level of the input signal 10. The magnitude of the current will of course determine the voltage drop across resistor 26 and consequently establish a potential at the emitter of transistor 20 which also is proportional to the magnitude of the negative signal peak. The effect of the emitter of transistor 20 and of course the base of transistor 28 falling is to cause increased current conduction through transistor 28. Consequently, the potential on the collector of transistor 28 increases, i.e., goes more positive so as to in turn increase conduction in the collector-emitter path of transistor 36. Consequently, the potential on the emitter of transistor 36 goes more positive also.

It therefore can be seen that in response to a negative going input signal applied to input terminal 14, the potential on the first electrode of capacitor 40, that is, the electrode connected to the emitter of transistor 20, tends to go negative while the other capacitor electrode tends to go positive. This effect can be attributed to the utilization of the two emitter-follower circuits coupled by the inverter amplifier circuit including transistor 28. The effect of providing the inverter amplifier for responding to potential changes at the first electrode to establish an opposite potential change at the second electrode causes the capacitor 40 to charge very rapidly. Assuming an extreme negative input signal peak, transistors 20 and 36 would operate close to saturation so that the potential on the first capacitor electrode would be close to —E and the potential on the second electrode would be close to +V. Since the meter 12 is connected through a resistor 42 between the second capacitor electrode and the source of negative reference potential —E, it can indicate the voltage level across capacitor 40, which as should be apparent, reflects the magnitude of the negative input signal peak.

Assume that the input signal subsequently becomes positive with respect to +V. This action has the effect of substantially cutting off current flow through transistor 20. Consequently, transistor 28, resistor 26, and capacitor 40 act as a Miller integrator effectively multiplying the capacitance of 40 by the gain of the transistor 28. The capacitor 40 tends to discharge through the second series circuit branch including resistors 26 and 38. Because the second capacitor electrode has been charged positive with respect to the first capacitor electrode, the capacitor 40 will tend to direct a current through resistors 26 and 38 in the same direction as would be caused by the sources of reference potential +E and —E. Inasmuch as the value of resistor 26 is significantly greater than the value of resistor 38, the effect of the current through the second series circuit branch is to initially cause the first capacitor electrode to go more negative. This action tends to cause a high charging current to flow through resistor 26 into the first terminal of capacitor 40. The value of this charging current is held down however, by the action of transistors 28 and 36.

Inasmuch as the first electrode of capacitor 40 initially goes negative when the input signal starts to go positive, an increased current flow results in the emitter-collector path of transistor 28, thereby driving the collector thereof more positive. In turn, an increased current flow in the collector-emitter path of transistor 36 results, thereby tending to cause the emitter potential thereof to go more positive. The positively going potential on the emitter of transistor 36 and the second capacitor electrode tends to oppose the charging current in the second series circuit branch.

Consequently, the time constant or discharge time of the capacitor 40 through the second series circuit branch when the input signal goes positive, is relatively long compared to the time constant of the first series circuit branch utilized to charge the capacitor 40 when the input signal goes negative. The effect of maintaining the charge on the capacitor 40 for a relatively long time duration after a negative input signal peak, permits the meter 12 to maintain an indication of the value of that negative peak for a sufficiently long period to permit the meter to be read.

From the foregoing, it should be appreciated that a simple circuit arrangement has been disclosed herein which at a very modest cost permits a randomly varying signal to be monitored so as to enable a conventional meter to display the value of an input signal peak for a sufficient time to permit the value to be read.

What is claimed is:

1. A detection circuit for detecting and indicating the magnitude of peaks of a randomly varying input signal comprising first and second sources of opposite polarity reference potentials, a capacitor having first and second electrodes, first and second impedances respectively connecting said first and second electrodes to said first and second sources of potential, a first transistor connected in emitter-follower configuration, said first transistor having its emitter connected to said first electrode of said capacitor and its collector connected to said second source of potential, means coupling said randomly varying input signal to the base of said first transistor for establishing current flow through the emitter-collector path of said first transistor in response to an input signal of a first polarity to thereby establish a potential at said first capacitor electrode having magnitudes proportional to the magnitudes of said input signal of said first polarity and terminating current flow through said emitter-collector path in response to an input signal of a second opposite polarity, a third source of potential having the same polarity as and a lesser magnitude than first source of potential, a second transistor of the same conductivity type as said first transistor, said second transistor having its base connected to said first electrode of said capacitor, means coupling the collector and emitter of said second transistor respectively to second and third source of potential to bias said second transistor for conduction in response to said potential at said first capacitor electrode and establish an inverted potential at said collector of said second transistor proportional to said potential at said first electrode, a third transistor of opposite conductivity type as said first transistor and connected in emitter-follower configuration, said third transistor having its emitter connected to said second electrode of said capacitor, its base connected to said collector of said second transistor, and its collector connected to said third source of potential, and measuring means coupled across said second impedance for measuring the potential thereacross.

2. In combination with an input signal source, a detection circuit comprising a capacitor having first and second electrodes, first and second sources of opposite polarity reference potentials, first and second impedances respectively connecting said first and second sources to said first and second electrodes of said capacitor, a transistor having an emitter connected to said first capacitor electrode and a collector connected to said second source of potential, means connecting said input signal source to the base of said transistor for establishing in response to an input signal of a first polarity a current through the emitter-collector path of said transistor to thereby establish a potential at said first capacitor electrode having magnitudes proportional to the magnitude of said input signal and terminating current flow through said emitter-collector path in response to an input signal of a second opposite polarity, inverter means coupled between said first and second capacitor electrodes for effecting an opposite potential change at said second electrode responsive to a potential change at said first electrode, and measuring means coupled across said second impedance for measuring the potential thereacross.

3. A detector circuit for detecting and indicating the magnitude of peaks of a randomly varying input signal comprising a first source of positive potential, a second source of positive potential of lesser magnitude than said first source, a source of negative potential, a first transistor of the PNP type having a collector connected to said source of negative potential, a first impedance connecting the emitter of said first transistor to said first source of positive potential, a diode having an anode connected to the base of said first transistor and a cathode connected to said second source of positive potential, a resistor connected in parallel with said diode, a second transistor of the NPN type having a collector connected to said second source of positive potential, a second impedance connecting the emitter of said second transistor to said source of negative potential, a capacitor connected between the emitters of said first and second transistors, an inverter amplifier having an input terminal connected to the emitter of said first transistor and an output terminal connected to the base of said second transistor, means for applying said input signal to the base of said first transistor, and measuring means coupled across said second impedance for measuring the potential thereacross.

References Cited by the Examiner

UNITED STATES PATENTS 3,212,324   10/1965   Martin _____ 324—111 X

WALTER L. CARLSON, *Primary Examiner.*

RUDOLPH V. ROLINEC, *Examiner.*

G. L. LETT, *Assistant Examiner.*